2,841,612
Patented July 1, 1958

2,841,612

MANUFACTURE OF p-TOLUENE SULFONIC ACID

Leonard M. Wylie, Atlanta, Ga., assignor to Tennessee Corporation, New York, N. Y., a corporation of New York No Drawing. Application September 6, 1956
Serial No. 608,208

3 Claims. (Cl. 260—505)

This invention relates to the sulfonation of toluene in such a manner as to produce a very high ratio of para-toluene sulfonic acid to ortho-toluene sulfonic acid in the sulfonated products.

For some purposes para-toluene sulfonic acid of high purity is needed. This is the case, for example, when the sulfonic acid is used in the manufacture of para-cresol, a disinfectant and fumigant which is also used in dyestuffs and further is an intermediate for the manufacture of 2,6 ditertiary butyl p-cresol, a well known anti-oxidant. When toluene is sulfonated by usual processes, however, a substantial amount of isomeric ortho-toluene sulfonic acid is formed along with the desired para-toluene sulfonic acid, and in many cases this mixture is not well suited for use without first being purified. Thus when toluene is sulfonated with sulfur trioxide dissolved in liquid sulfur dioxide by adding one of the reacting liquids into the other according to conventional practice, as much as 8–10% of the undesired ortho isomer may be formed. The separation of the ortho isomer by known purification methods is difficult and expensive.

The copending application of Samuel L. Norwood and Thomas W. Sauls, Serial No. 574,616, filed March 29, 1956, and entitled Manufacture of p-Toluene Sulfonic Acid, discloses and claims a process which results in a substantial increase in the amount of the desired para isomer formed in the reaction and corresponding reduction in the amount of the undesired ortho isomer, thus minimizing the purification process as well as giving a more economical yield. In this process the sulfonating agent is $SO_3$ dissolved in liquid $SO_2$, and the liquid sulfonation mixture and liquid toluene are fed simultaneously to the reaction vessel at equivalent rates. The para/ortho isomer ratio obtained in this way may average 96.5/3.5 and sometimes is as high as 97/3, as compared with an average ratio of 91.5/8.5 in ordinary batch procedures.

It will be seen that the aforesaid Norwood-Sauls process produces excellent results, but on the other hand there are occasions when it is not desirable to follow this procedure and I have found that substantially the same results can be obtained by the alternative procedure set forth hereinafter. Further this alternative procedure has the advantage that accurate metering of the rates of flow of the reactants is not required.

The sulfonation mixture is prepared by dissolving $SO_3$ in liquid $SO_2$. The total amount of $SO_3$ should be between 0.9 and 1.25 moles per mole of toluene to be sulfonated. The proportion of $SO_2$ to $SO_3$ is not critical and may vary widely, but usually will be within the limits of 5 to 20 parts by weight of liquid $SO_2$ to one part of $SO_3$. Below the ratio of 5/1, there is poorer conversion of toluene to toluene sulfonic acid and increasing quantities of sulfone are formed.

I divide the toluene to be sulfonated into two parts and add one part thereof together with all of the sulfonation mixture to the reaction vessel. Thus in the first stage of the sulfonation reaction, the ratio of $SO_3$ to toluene is greater than the molar ratios stated above for the total quantities of $SO_3$ and toluene. The reactants in this first stage (i. e., the total $SO_2$—$SO_3$ mixture and part of the toluene) are added to the reactor simultaneously at rates corresponding approximately to the $SO_3$/toluene ratio, but accurate metering is not required. The addition can be made as rapidly as desired, provided the cooling capacity of the system to condense the $SO_2$ evolved by the heat of the reaction is not exceeded. Slower addition does not lower the para-ortho isomer ratio, however, and it may be desirable to take advantage of this fact in order to decrease the cooling capacity required.

When the addition of the first stage reactants has been completed as set forth above, the remainder of the toluene is then added to the reaction mass as rapidly as desired. This second toluene addition need not be made immediately on completion of the first stage, but on the other hand no intervening lapse of time is required and the second toluene fraction will usually be added promptly to expedite the reaction. For the same reason the addition of this second fraction will usually take place as rapidly as possible.

Considerable variation is possible in the proportions of the two toluene fractions and accordingly in the ratio of $SO_3$ to toluene in the first stage of the reaction. Usually it will be undesirable for this ratio to exceed 5/1, since the percent of disulfonic acid in the reaction products tends to increase unduly for some purposes. Thus if the molar ratio of total $SO_3$ to toluene is 1/1, then if 80% of the toluene is withheld for second stage, the molar ratio in the first stage will be 5%1. On the other hand, the lower limit of the $SO_3$/toluene ratio in the first stage is determined by the fact that a substantial quantity of toluene, say 20% or more of the total toluene, must be held back for addition to the reaction mass in the second stage. Thus if the molar ratio of total $SO_3$ to toluene is 1/1, and 20% of the toluene is withheld for the second stage, the molar ratio in the first stage will be 5/4.

The sulfonation reaction is carried out substantially at atmospheric pressure and the temperature is dependent on the ratio of $SO_2$ to $SO_3$. When the weight ratio of these materials is 5:1, for example, the temperature of the reaction mixture may be about 22° F., whereas if the weight ratio is 8:1 or higher the temperature is about 14° F. Before addition to the reactor, the toluene will usually be at room temperature, say 70–85° F. When the sulfonation medium and the toluene are mixed in the reactor, the temperature of the reaction mixture may rise somewhat (say to 32° F. or more) due to absorption of heat from the reaction vessel by the incoming reagents, but soon drops back to a fairly constant figure between about 14° F. and 22° F. It will be understood that the temperature may be as high as the temperature resulting from adiabatic operation.

If desired, glacial acetic acid in amount not greater than about 2% of the sulfonic acid to be formed can be added to the reaction vessel as disclosed and claimed in the copending application of Samuel L. Norwood and Thomas W. Sauls, Serial No. 454,201, filed September 3, 1954. The acetic acid in conjunction with the low temperature of the reaction minimizes sulfone formation.

Under the above conditions, the sulfonation reaction is completed by the time the second addition has been made and it is only necessary to remove and recover the residual $SO_2$ in any suitable manner.

The following is a typical example of processes embodying the invention: 1.74 pounds of glacial acetic acid were placed in an agitated vessel. 660 pounds of liquid $SO_2$ were weighed out in a jacketed vessel and 81 pounds of freshly distilled $SO_3$ were added. 91.2 pounds of toluene were weighed out in another holding vessel. The $SO_3$—$SO_2$ solution and the toluene were metered into the agitated vessel containing the glacial acetic acid. At the end of 13 minutes, all of the $SO_3$—$SO_2$ solution and 46.5 pounds of toluene had been added to this vessel. The remainder of the toluene was still in the holding tank. This toluene was then added to the reaction vessel during a period of 5 minutes. The total time of addition of the reagents to the agitated vessel was 18 minutes. The reactor was heated to remove the $SO_2$, leaving the toluene sulfonic acid in the reactor. The toluene sulfonic acid produced in this example had the following analysis:

| | |
|---|---|
| Toluene sulfonic acid percent | 94.05 |
| p-Toluene sulfonic acid as percentage of total toluene sulfonic acid do | 96.2 |
| Sulfone do | 0.90 |
| $H_2SO_4$ do | 1.69 |
| Neutral equivalent | 5.98 |
| Mole ratio of $SO_3$ to toluene added initially | 2:1 |

The following table shows the results of additional examples following the same procedure.

| | Batch 31 | Batch 41 | Batch 42 | Batch 30A | Batch 31A |
|---|---|---|---|---|---|
| Lbs. $SO_3$ | 78.38 | 81 | 79.7 | 79.06 | 79.06 |
| Lbs. Toluene | 89.6 | 91.2 | 90 | 90.01 | 90.01 |
| Lbs. HAc | 1.71 | 1.74 | 1.71 | 1.35 | 1.35 |
| $SO_2$ in reactor initially | 120 | None | None | None | None |
| $SO_2$ as solvent for $SO_3$ | 540 | 660 | 660 | 632 | 632 |
| Time for addition $SO_3$—$SO_2$, minutes | 11 | 13 | 13 | 13 | 13 |
| Amount of toluene added in initial period | 45.60 | 46.5 | 45.8 | 36.4 | 26.39 |
| Time for addition of remainder of toluene, minutes | 4.8 | 5 | 4 | 6 | 7 |
| Analysis of product: | | | | | |
| Percent TSA | 96.87 | 94.05 | 95.67 | 94.73 | 96.07 |
| p-ratio | 97 | 96.2 | 96.2 | 95 | 95 |
| Percent sulfone | .96 | .90 | 1.00 | 1.03 | 1.52 |
| Percent $H_2SO_4$ | 1.28 | 1.69 | 1.77 | 1.57 | 1.10 |
| Neut. Equiv | 6.06 | 5.98 | 6.09 | 5.96 | 5.94 |
| Mole ratio, $SO_3$ : toluene added initially | 2:1 | 2:1 | 2:1 | 2.5:1 | 3.5:1 |
| Lbs. of product Recovered | 170.75 | 170.75 | 168.7 | 175.0 | 170.0 |
| Percent Conversion of Toluene to p-TSA | 95.7 | 90.3 | 92.0 | 93.7 | 92.3 |

The fact that substantially no disulfonation takes place in the above process can be shown by analyzing the products for sulfur, after removal of inorganic sulfur and sulfones. Analyses of two products produced by typical runs are as follows:

*Percent sulfur*

| | 31A | 32A |
|---|---|---|
| Found | 16.40 | 16.47 |
| Theoretical for TSA: | | |
| without HAc Catalyst | 16.43 | 16.43 |
| with HAc Catalyst | 16.28 | 16.28 |

The ratio of para to ortho isomers produced by the foregoing procedure can be determined by the method described by Holleman and Caland, Ber., 44, 2504–25 (1911), and by Harding, J. Chem. Soc., 119, 260–2 (1921). Briefly, the toluene sulfonic acid or its salt is converted to toluene sulfonyl chloride by reaction with phosphorous pentachloride and phosphorous oxychloride. After careful purification of the sulfonyl chloride by distillation, the freezing or melting point of the mixture indicates the ratio of isomers.

As compared with usual batch procedures in which one of the reacting liquids is added more or less gradually into the other liquid, the ratio of para to ortho isomers obtained by the procedure set forth above is substantially higher. In the series of runs set forth above, for example, the ratio was 95.9, as compared with an average ratio between 92 and 93 in the case of usual batch procedures. Further in some cases the procedure embodying the present invention resulted in ratios as high as 97/3.

It will be understood that the invention is not limited to the details of the foregoing description and that reference should be had to the appended claims for a definition of its limits.

What is claimed is:

1. A process for making toluene sulfonic acid having a high ratio of para isomer to ortho isomer which comprises sulfonating one mole of toluene with 0.9 to 1.25 moles of sulfur trioxide dissolved in liquid sulfur dioxide, the sulfonation reaction being conducted in two stages by dividing the total toluene into two lots, sulfonating one lot with the total $SO_3$—$SO_2$ mixture in the first stage and then adding the second lot of toluene to the sulfonation mass in the second stage, said stages both being conducted at substantially atmospheric pressure while condensing the $SO_2$ gas evolved by the heat of reaction, and removing residual $SO_2$ from the sulfonation mass.

2. A process as defined in claim 1, wherein the second lot of toluene is not less than about 20% of the total toluene.

3. A process as defined in claim 1, wherein the second lot of toluene is limited so that the molar ratio of $SO_3$ to toluene in said first stage does not exceed about 5:1.

References Cited in the file of this patent

UNITED STATES PATENTS

| | | |
|---|---|---|
| 1,422,564 | Grob et al. | July 11, 1922 |
| 2,225,564 | LeMaistre | Dec. 17, 1940 |
| 2,362,612 | Brown | Nov. 14, 1944 |
| 2,704,295 | Gilbert et al. | Mar. 15, 1955 |